United States Patent
Fujiwara et al.

(10) Patent No.: US 7,119,855 B2
(45) Date of Patent: Oct. 10, 2006

(54) IMAGE DISPLAY WITH DISPLAY-SWITCHING FUNCTION

(75) Inventors: Shuichi Fujiwara, Minamiazumi-gun (JP); Takefumi Sakakibara, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 677 days.

(21) Appl. No.: 10/391,791

(22) Filed: Mar. 20, 2003

(65) Prior Publication Data

US 2004/0027486 A1  Feb. 12, 2004

(30) Foreign Application Priority Data

Mar. 28, 2002  (JP) .............................. 2002-092798

(51) Int. Cl.
H04N 5/268 (2006.01)
H04N 3/27 (2006.01)

(52) U.S. Cl. ............... 348/705; 348/552; 348/706; 348/14.11; 348/555; 348/554

(58) Field of Classification Search ........... 348/706, 348/705, 552, 554, 555, 569, 675, 744, 14.11, 348/14.04; 345/204, 214, 698, 699
See application file for complete search history.

(56) References Cited

U.S. PATENT DOCUMENTS

| | | | |
|---|---|---|---|
| 4,626,892 A | | 12/1986 | Nortrup et al. |
| 5,237,417 A | * | 8/1993 | Hayashi et al. ............ 348/569 |
| 5,438,375 A | * | 8/1995 | Sasabe et al. ............. 348/706 |
| 5,557,342 A | * | 9/1996 | Eto et al. .................. 348/706 |
| 5,917,552 A | * | 6/1999 | Van Court ................ 348/558 |
| 5,949,407 A | | 9/1999 | Sato |
| 6,008,836 A | * | 12/1999 | Bruck et al. .............. 725/131 |
| 6,204,884 B1 | * | 3/2001 | Lee ........................... 348/555 |
| 6,240,245 B1 | * | 5/2001 | Kato et al. ................ 386/131 |
| 6,266,103 B1 | * | 7/2001 | Barton et al. ............. 348/675 |
| 6,369,862 B1 | * | 4/2002 | Yamazaki .................. 348/744 |
| 6,384,868 B1 | * | 5/2002 | Oguma ...................... 348/564 |
| 6,393,194 B1 | * | 5/2002 | Mikami et al. ............ 386/46 |
| 6,462,786 B1 | * | 10/2002 | Glen et al. ................ 348/599 |
| 6,473,135 B1 | * | 10/2002 | Iwamura ................... 348/706 |
| 6,490,009 B1 | * | 12/2002 | Asakura .................... 348/705 |
| 6,825,858 B1 | * | 11/2004 | Sato .......................... 715/735 |
| 6,961,097 B1 | * | 11/2005 | Yui ............................ 348/584 |
| 6,973,255 B1 | * | 12/2005 | Kato .......................... 386/46 |
| 6,975,365 B1 | * | 12/2005 | Hirano ...................... 348/588 |
| 6,999,131 B1 | * | 2/2006 | Kishimoto et al. ....... 348/705 |
| 2001/0052946 A1 | | 12/2001 | Sato |
| 2002/0018069 A1 | | 2/2002 | Kim |

(Continued)

FOREIGN PATENT DOCUMENTS

EP    0 844 788 A2    5/1998

(Continued)

Primary Examiner—David Ometz
Assistant Examiner—Jean W. Désir
(74) Attorney, Agent, or Firm—Oliff & Berridge, PLC

(57) ABSTRACT

In an image display having a image generator for forming and displaying an optical image in accordance with inputted image signal and a controller for controlling the image generator, a controller (5) has a display-condition switching controller (510, 511) for switching a display-condition of the optical image formed by the image generator, an operation signal receiver (506) for receiving an operation signal for switching the display-condition of the optical image, and a display switching determining portion (509) for monitoring the received operation signal to determine the display-condition to be switched, the display-condition switching controller (510, 511) conducting switching operation based on a judgment of the display switching determining portion (509).

6 Claims, 14 Drawing Sheets

U.S. PATENT DOCUMENTS

2002/0035620 A1 3/2002 Takahashi et al.
2002/0154138 A1 10/2002 Wada et al.

FOREIGN PATENT DOCUMENTS

| | | |
|---|---|---|
| JP | 07-311639 A | 11/1995 |
| JP | A 8-304739 | 11/1996 |
| JP | 2000-041196 A | 2/2000 |
| JP | 2000-341614 A | 12/2000 |
| JP | A 2000-338925 | 12/2000 |
| JP | 2001-285751 A | 10/2001 |

* cited by examiner

IMAGE DISPLAY WITH DISPLAY-SWITCHING FUNCTION

BACKGROUND OF THE INVENTION

1. Field of the Invention

The present invention relates to an image display having an image generator for generating and displaying an optical image in accordance with an inputted image signal and a controller for controlling the image generator.

2. Description of Related Art

Recently, a plurality of input terminals corresponding to various signal format in accordance with the variety of image signal formats have come to be provided on an image display such as a projector, a computer display and a TV receiver for displaying various images by the image display.

Such image display capable of displaying various images has, for instance, an RGB signal input system, a composite signal input system and a component signal input system.

The RGB signal input system is for displaying a computer image. A signal including the image information is inputted to the RGB signal input system to display the computer image on, for instance, a projection surface of a projector, thereby conducting multi-presentation using the computer.

The composite signal input system is for a conventional signal such as television and video signal. A signal including the image information is inputted to the composite signal input system to display the image of a television and video on the image display, so that a large-screen projector can be used for home theater purpose.

The component signal input system is a high-quality signal input system to which the high-definition television signal or DVD (Digital Versatile Disk) signal is inputted, which is used for home theater purpose as in the composite signal input system.

Since the plurality of signal input systems are provided on an image display, the image display can be used for various purposes.

Incidentally, in order to switch the signal input systems of such an image display provided with a plurality of signal input systems, a changeover switch provided on an operating portion of a body or a remote controller is operated for a plurality of times to sequentially switch the signal input systems in an order of RGB signal, composite signal and component signal.

Since the image quality of the image display differs in accordance with the image signal inputted for the respective signal input systems, different color-mode can be set in accordance with the respective signal input systems and usage thereof The color-mode can be set, for instance, for normal purpose, meeting purpose, presentation purpose, and theater purpose, which is sequentially switched by pressing the changeover switch a plurality of times as in switching the signal input systems.

However, in such conventional image display, when one switching operation is executed, the input systems or the color-modes is switched in the image display and the next switching operation is not received before the input systems or the color-modes is actually switched. Accordingly, no changeover switch signal is received during the switching operation, thus taking long time for the switching operation.

Specifically, in switching the signal input systems, when the RGB signal input system is to be switched to the component signal input system, the controller of the image display controls a selector to switch from the RGB signal input system to the composite signal input system after operating the changeover switch once to display the composite signal image on a screen. It is only after the image is displayed that the controller receives the signal of the changeover switch, so that the second operation of the changeover switch can be conducted only after displaying the composite signal image, thus taking long time.

In the same manner, in switching the color-mode setting, since the controller of the image display receives the next switching operation only after switching lookup tables corresponding to the respective color-modes, the switching operation takes long time.

As described above, when the display condition of the image display is to be switched, the controller receives no switching operation by an operator while the image display executes actual switching operation of the display condition, so that the switching operation takes long time.

Further, since the display condition to be switched is not displayed on a screen during the switching operation, the operator cannot recognize the current switching condition, thus making switching operation difficult for the operator.

SUMMARY OF THE INVENTION

An object of the present invention is to provide an image display capable of switching display condition of an image display in speedy and easily-recognizable manner.

In order to achieve an object of the present invention, an image display according to an aspect of the present invention has: an image generator that forms an optical image in accordance with an inputted image signal; and a controller that controls the image generator, where the controller has: a display-condition switching controller that switches a display-condition of the optical image formed by the image generator; an operation signal receiver that receives an operation signal for switching the display-condition of the optical image; and a display switching determining portion that monitors the received operation signal to make a judgment on the display-condition to be switched, the display-condition switching controller switching the display-condition based on the judgment of the display switching determining portion.

The display-condition to be switched may be switch setting of signal input systems or a color-mode switching setting in accordance with usage thereof.

The operation signal to be received by the operation signal may be an operation signal of a remote controller annexed to the image display or an operation signal from a device provided on the image display.

According to the above aspect of the present invention, since the switching operation is conducted by the display-condition controller after the judgment of the display switching determining portion, the switching operation of the display condition is not executed each time the operation signal is received, the display condition can be switched after designating the final display-condition, thereby accelerating the switching operation of the display-condition.

In the above, the display switching determining portion may preferably show a screen indicating a list of the switchable display-conditions to urge selection of the display-condition to be switched.

According to the above arrangement, since the operator can select the desired display-condition while checking the list of the display-conditions, the switching operation of the display-condition can be conducted in an easily-recognizable manner.

The display switching determining portion may preferably determine the display-condition to be switched on condition that the operation signal is not inputted for a predetermined time after showing the list of display-conditions.

Since the display switching determining portion make a judgment as in the above, the operator only has to select the one of the options on the screen and the switching operation of the display-condition can be automatically conducted, thereby simplifying the switching operation of the display-condition.

Alternatively, the display switching determining portion may preferably determine the display-condition to be switched on condition that a predetermined operation signal is received.

The predetermined operation signal refers to an operation signal transmitted by pressing a predetermined switch of the operation switches of remote controller etc., which may be an enter key.

According to the above arrangement, since the display-condition is switched when the operator explicitly presses the predetermined operation switch, the display-condition can be securely switched to the desired display-condition intended by the operator.

When the operation signal receiver receives the operation signal during the switching operation of the display-condition switching controller, the display switching determining portion may preferably determine the display-condition to be switched on condition that the operation signal is not inputted for a predetermined time after showing the list of the display-condition.

According to the above arrangement, while the operation signal is continuously inputted to the operation signal receiver, i.e. the display-condition setting is changed in cyclic manner, the switching operation is not conducted. The high-speed switching operation can be conducted as in the above since the display switching determining portion determines that the operation signal is not inputted for a predetermined time after the operator determines the display-condition setting.

The display switching determining portion may preferably show an image representing a switching operation information received by the operation signal receiver.

According to the above arrangement, since the operator can conduct the switching operation while checking the selected display-condition on the screen, the switching operation can be conducted in an easily-recognizable manner.

When the above-described image display has a plurality of input terminals for the image signal to be inputted from a plurality of image devices, the display-condition may preferably be a connection setting of the plurality of input terminals or a color-mode setting including γ correction and color compensation.

As described above, the present invention can be suitably applied for switching the connection setting or the color-mode setting, since there are a lot of options and switching operation takes considerable time.

DETAILED DESCRIPTION OF PREFERRED EMBODIMENT(S)

Embodiments of the present invention will be described below with reference to attached drawings.

[1. First Embodiment]

(1) Primary Arrangement of Projector

Figure 1:
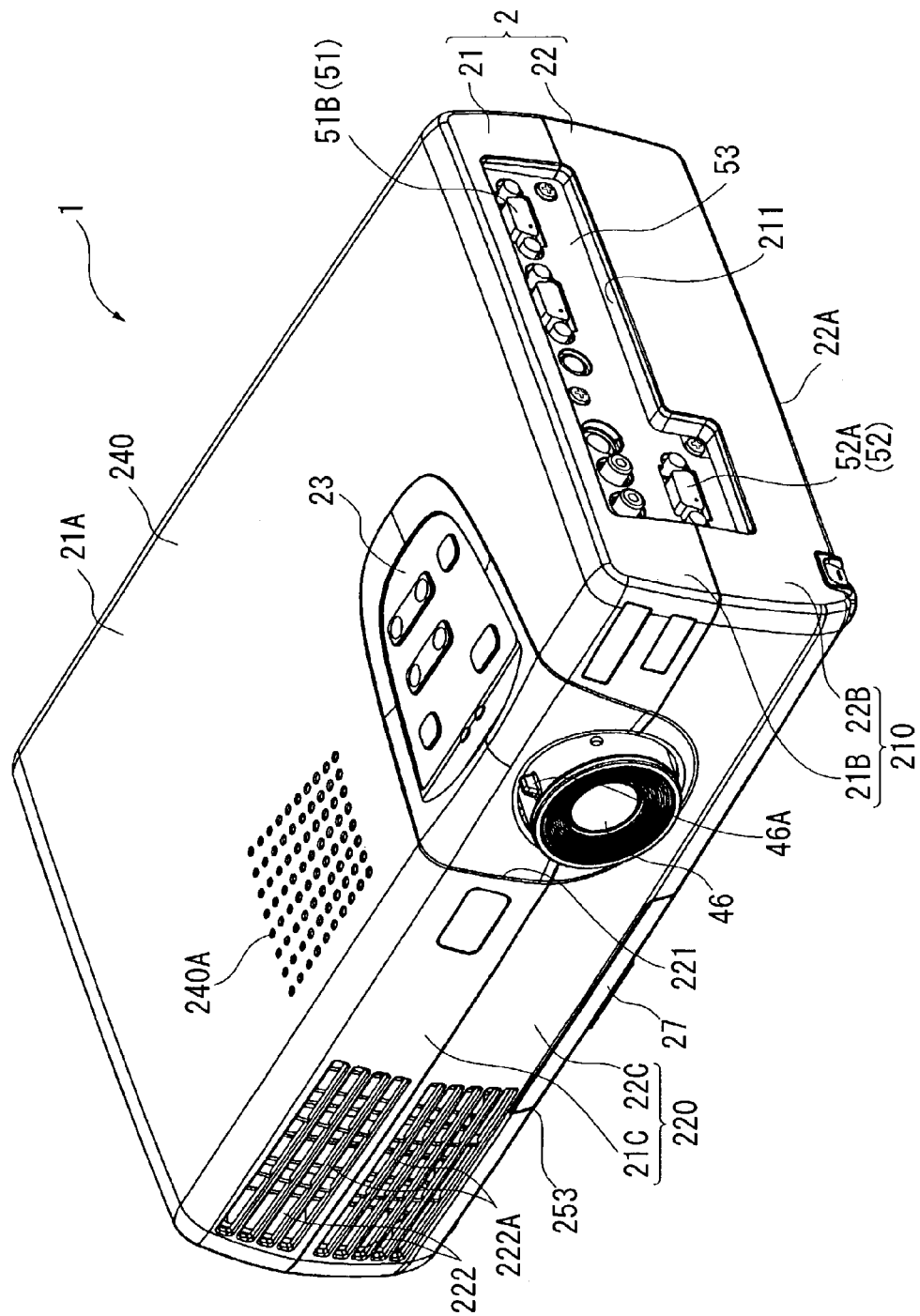
FIG. 1 is a perspective view showing a projector seen from upper side according to a first embodiment of the present invention.
Figure 2:
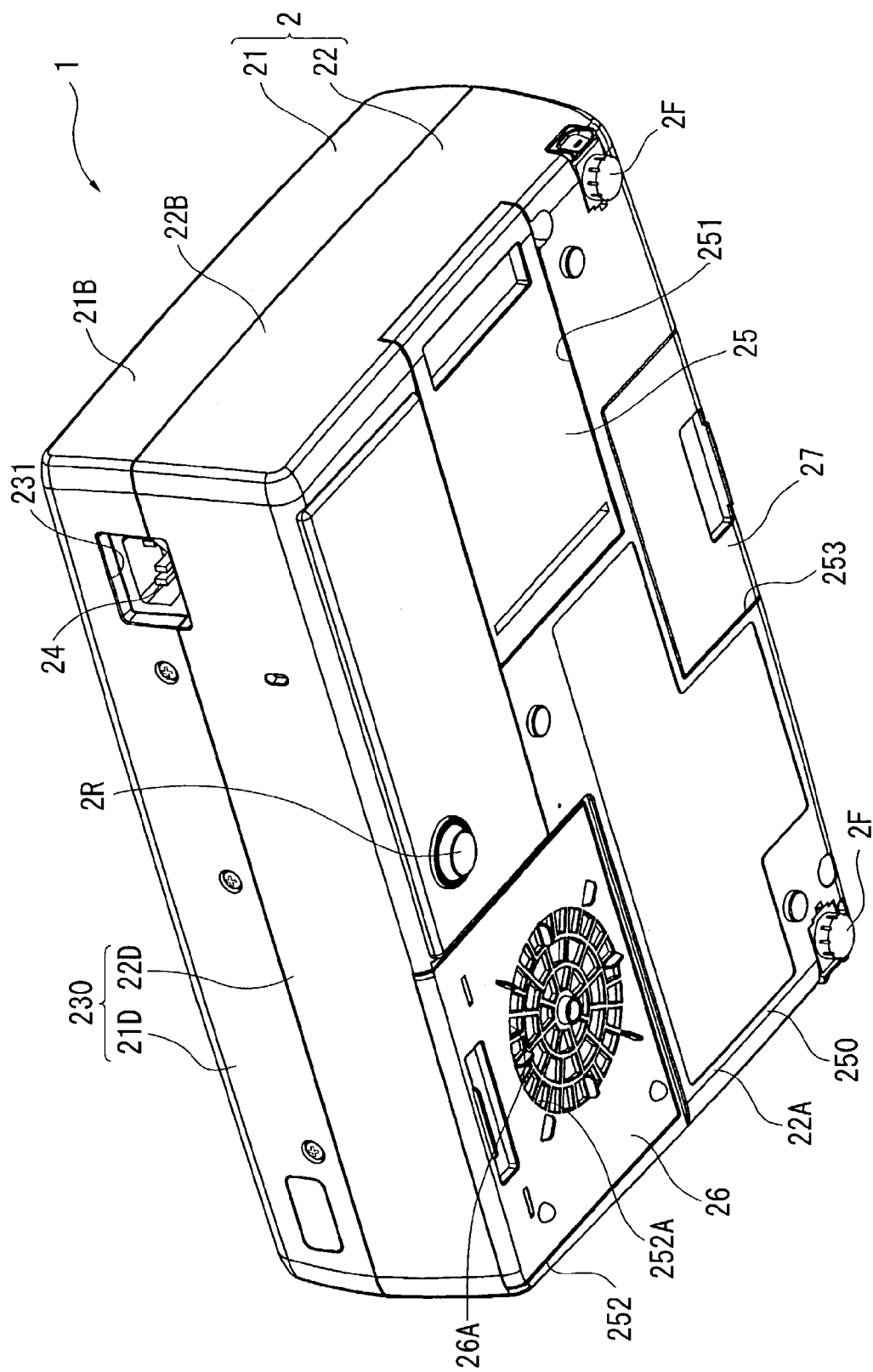
FIG. 2 is a perspective view showing the projector seen from lower side according to the aforesaid embodiment of the present invention.

FIG. 1 is a perspective view of a projector 1 seen from upper front side according to an aspect of the present invention. FIG. 2 is a perspective view of the projector 1 seen from lower rear side.

As shown in FIGS. 1 and 2, the projector 1 has an approximately rectangular parallelepiped exterior case 2 made by injection molding. The exterior case 2 is a casing for accommodating a body of the projector 1, which includes an upper case 21 and a lower case 22, the cases 21 and 22 being attachable and detachable.

As shown in FIGS. 1 and 2, the upper case 21 includes an upper portion 21A, a lateral portion 21B, a front portion 21C and a rear portion 21D respectively constituting the upper side, lateral side, front side and rear side of the projector 1.

In the same manner, the lower case 22 includes a lower portion 22A, a lateral portion 22B, a front portion 22C and a rear portion 22D respectively constituting the lower side, lateral side, front side and rear side of the projector 1.

Accordingly, as shown in FIGS. 1 and 2, the lateral sides 21B and 22B of the upper case 21 and the lower case 22 are continuously connected to form a lateral side 210 of the rectangular parallelepiped exterior case 2. Similarly, the front portions 21C and 22C are connected to form a front side 220, the rear portions 21D and 22D are connected to form a rear side 230, the upper portion 21A forms an upper side 240 and the lower portion 22A forms a lower side 250.

As shown in FIG. 1, an operation panel 23 is provided on the front side of the upper side 240, and a sound-outputting speaker hole 240A is formed around the operation panel 23.

An opening 211 spanning over the two lateral portions 21B and 22B is formed on the lateral side 210 on the right side seen from front side. A below-described main board 51 and an interface board 52 are provided in the exterior case 2 and a connector 51B installed on the main board 51 and a connector 52A installed on the interface board 52 are exposed to the outside through an interface panel attached to the opening 211. Exterior electronics etc. are connected to the projector through the connectors 51B and 52A.

A circular opening 221 spanning between two front portions 21C and 22C is formed around the operation panel on the right side seen from the front side 220. A projection lens 46 is disposed inside the exterior case 2 corresponding to the opening 221. At this time, a distal end of the projection lens 46 is exposed to the outside from the opening 221 and the focusing operation of the projection lens 46 can be manually conducted through a lever 46A as a part of the exposed portion.

An exhaust hole 222 is formed on the front side 220 opposite to the opening 221. A safety cover 222A is formed on the exhaust hole 222.

As shown in FIG. 2, a rectangular opening 231 is formed on the right side of the rear side 230 seen from rear side. An inlet connector 24 is exposed from the opening 231.

A rectangular opening 251 is formed at the center of the right end of the lower side 250 seen from bottom side. A lamp cover 25 covering the opening 251 is detachably attached to the opening 251. A non-illustrated light source lamp can be easily exchanged by detaching the lamp cover 25.

A rectangular surface 252 dented inward is formed on the left rear corner of the lower side 250 seen from bottom side. An intake 252A for drawing in cooling air from the outside is formed on the rectangular surface 252. An intake cover 26 covering the rectangular surface is detachably provided on the rectangular surface 252. An opening 26A corresponding to the intake 252A is formed on the intake cover 26. A non-illustrated air filter is provided on the opening 26A to prevent invasion of dust into the interior of the casing.

A rear leg 2R constituting one of the legs of the projector 1 is formed approximately at the center on the rear side of the lower side 250. Further, front legs 2F also constituting the legs of the projector 1 are respectively provided on the right and left corners on the front side of the lower side 250. In other words, the projector 1 is supported on three points by the rear leg 2R and the two front legs 2F.

The two front legs 2F is vertically advanceable and retractable, so that the inclination (attitude) of the projector 1 in front and back direction and right and left direction can be adjusted to adjust the position of the projection image.

Further, as shown in FIGS. 1 and 2, a rectangular parallelepiped recess 253 is formed approximately at the center of the front side of the exterior case 2 spanning over the lower side 250 and the front side 220. A cover 27 covering the lower side and front side of the recess 253 and slidable in front and back direction is provided on the recess 253. A non-illustrated remote controller for remotely controlling the projector 1 is accommodated in the recess 253 covered by the cover 27.

Figure 3:
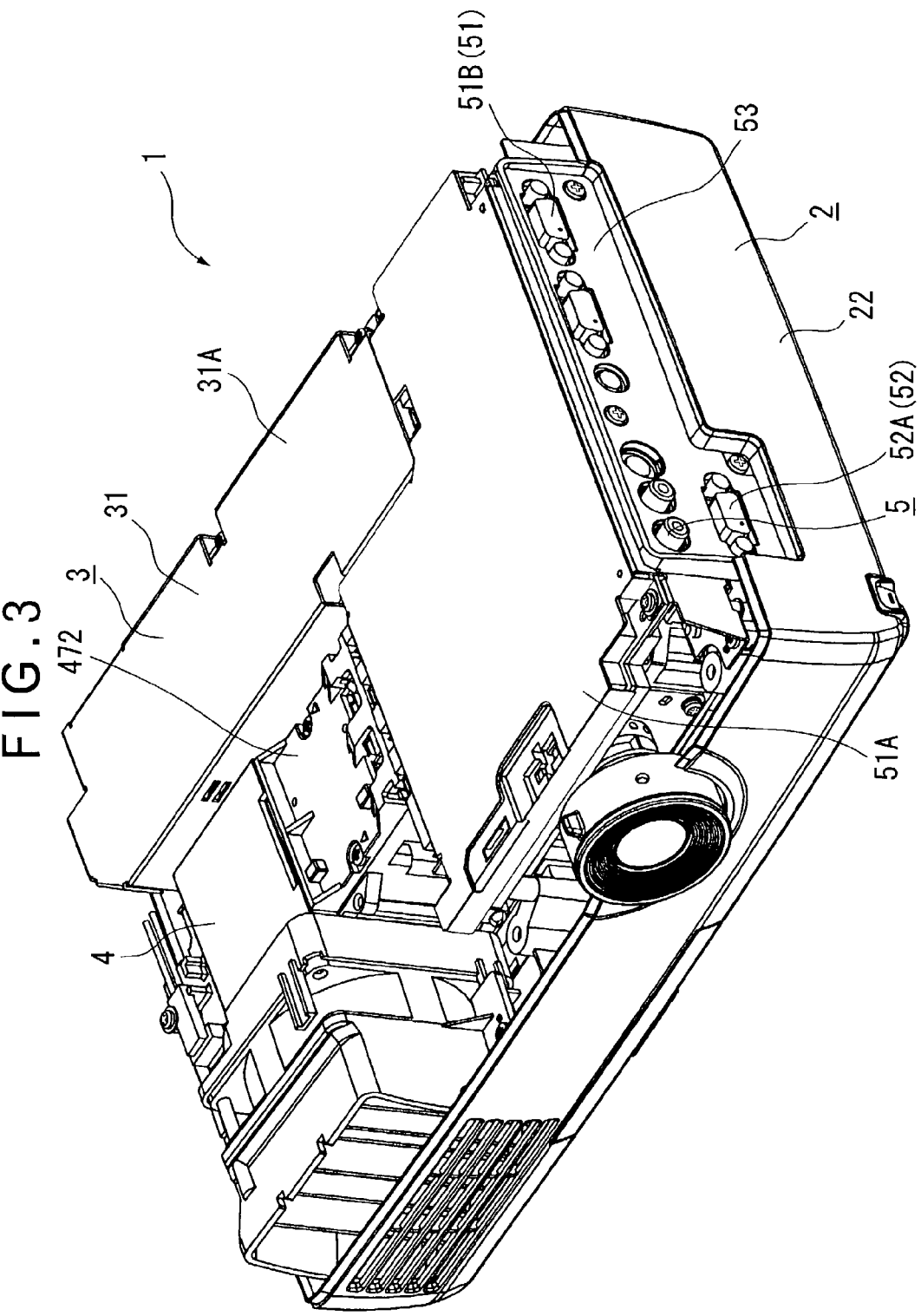
FIG. 3 is a perspective view showing an interior structure of the projector of the aforesaid embodiment.
Figure 4:
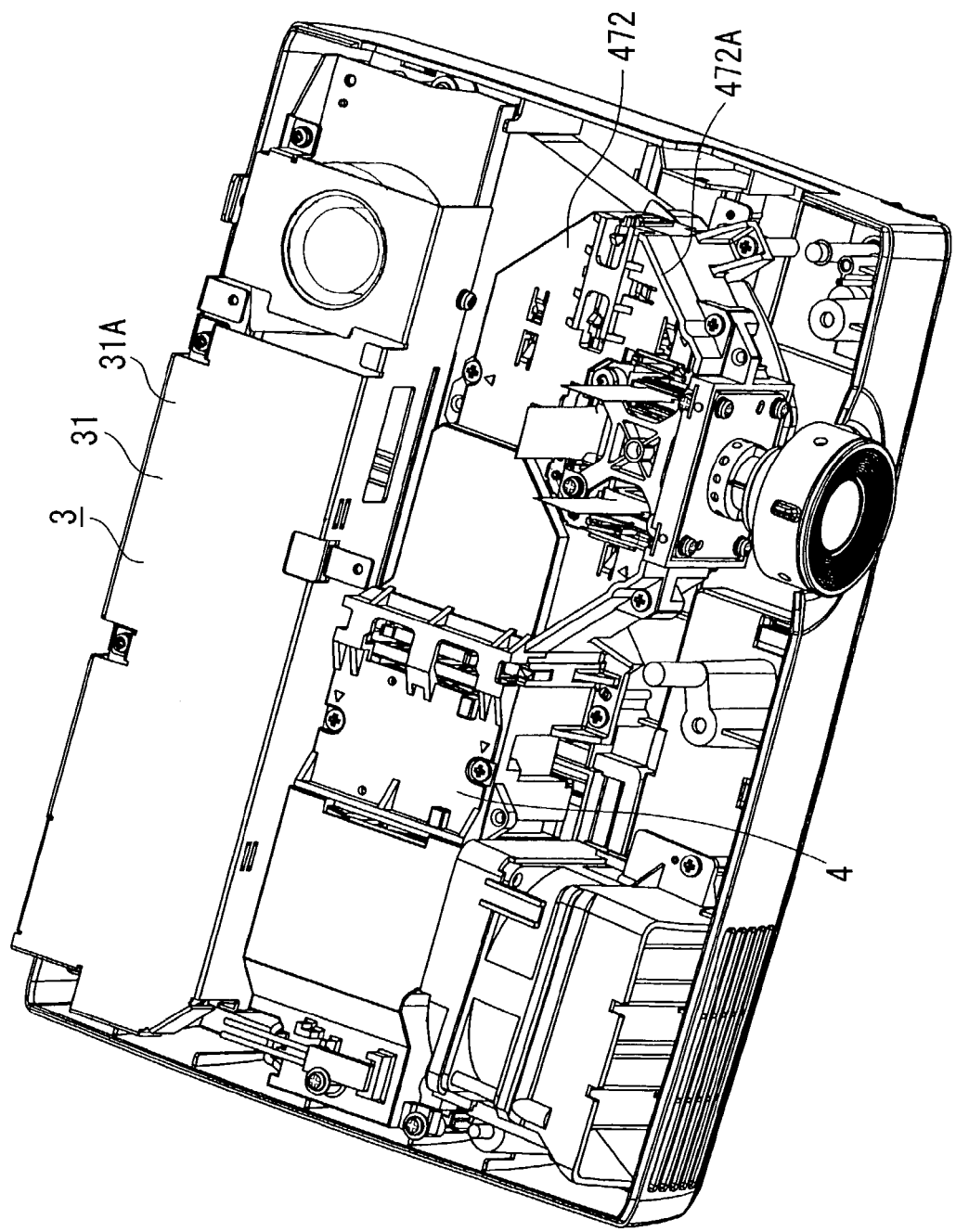
FIG. 4 is a perspective view showing an interior structure of the projector of the aforesaid embodiment.

FIGS. 3 and 4 are perspective view showing the interior of the projector 1. Specifically, FIG. 3 is an illustration showing the upper case 21 being removed from FIG. 1. FIG. 4 is an illustration with a control board 5 being removed from FIG. 3.

As shown in FIGS. 3 and 4, the exterior case has a power source unit 3 disposed along the rear side and extending in right and left direction, an optical unit 4 disposed on the front side of the power source unit 3 as a planarly-viewed L-shaped optical system and the control board 5 as a controller disposed on the upper right side of the units 3 and 4. The components 3 to 5 constitute the primary portion of the projector 1.

The power source unit 3 has a power source 31 and a non-illustrated lamp driving circuit (ballast) disposed below the power source 31.

The power source 31 supplies the electric power from the outside to the lamp driving circuit, the circuit board 5 etc. through a non-illustrated power cable connected to the inlet connector.

The lamp driving circuit supplies electric power fed by the power source 31 to a light source lamp (not shown in FIGS. 3 and 4) of the optical unit 4, which is electrically connected to the light source lamp. The lamp driving circuit is, for instance, constructed by wiring on a board.

The power source 31 and the lamp driving circuit are vertically arranged approximately in parallel, which occupy the space extending in right and left direction on the rear side of the projector 1.

The surroundings of the power source 31 and the lamp driving circuit are covered with a metal shield 31A such as aluminum with right and left sides thereof being opened.

The shield 31A works as a duct for guiding the cooling air and prevents leakage of the electromagnetic noise generated by the power source 31 and the lamp driving circuit toward the outside.

As shown in FIG. 3, the control board 5 is disposed to cover the upper side of the units 3 and 4, which includes the main board 51 including a CPU and the connector 51B and the interface board 52 disposed below the main board 51 and including the connector 52A.

In the control board 5, the CPU on the main board 51 controls a liquid crystal panel of the below-described optical device in accordance with the image information inputted through the connectors 51B and 52A.

The surroundings of the main board 51 are covered with a metal shield 51A. Though not clearly shown in FIG. 3, the main board 51 abuts to an upper end 472A of an upper light guide 472 of the optical unit 4.

(2) Detailed Construction of Optical Unit

Figure 5:
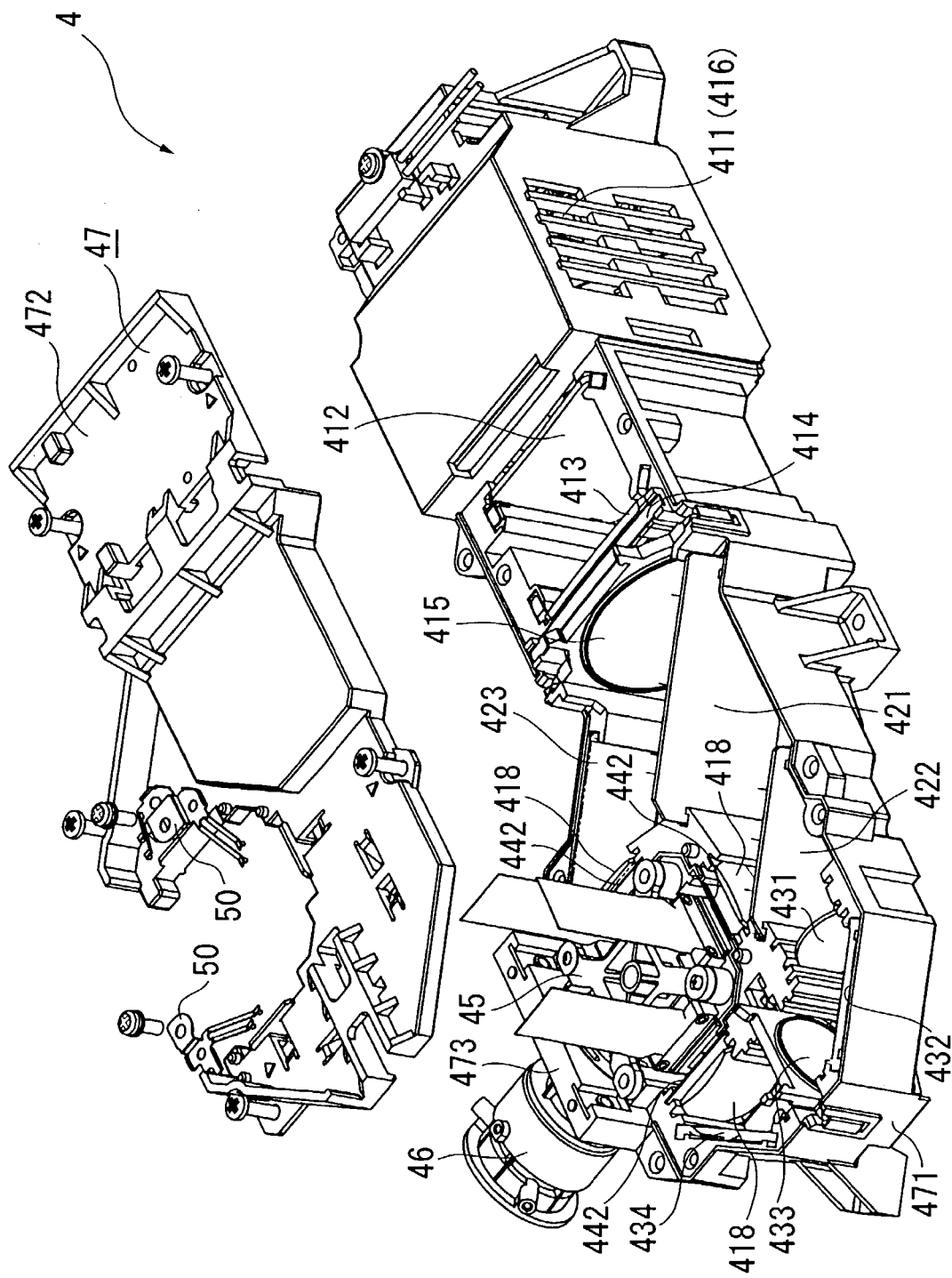
FIG. 5 is a perspective view showing a structure of the optical system of the aforesaid embodiment.
Figure 6:
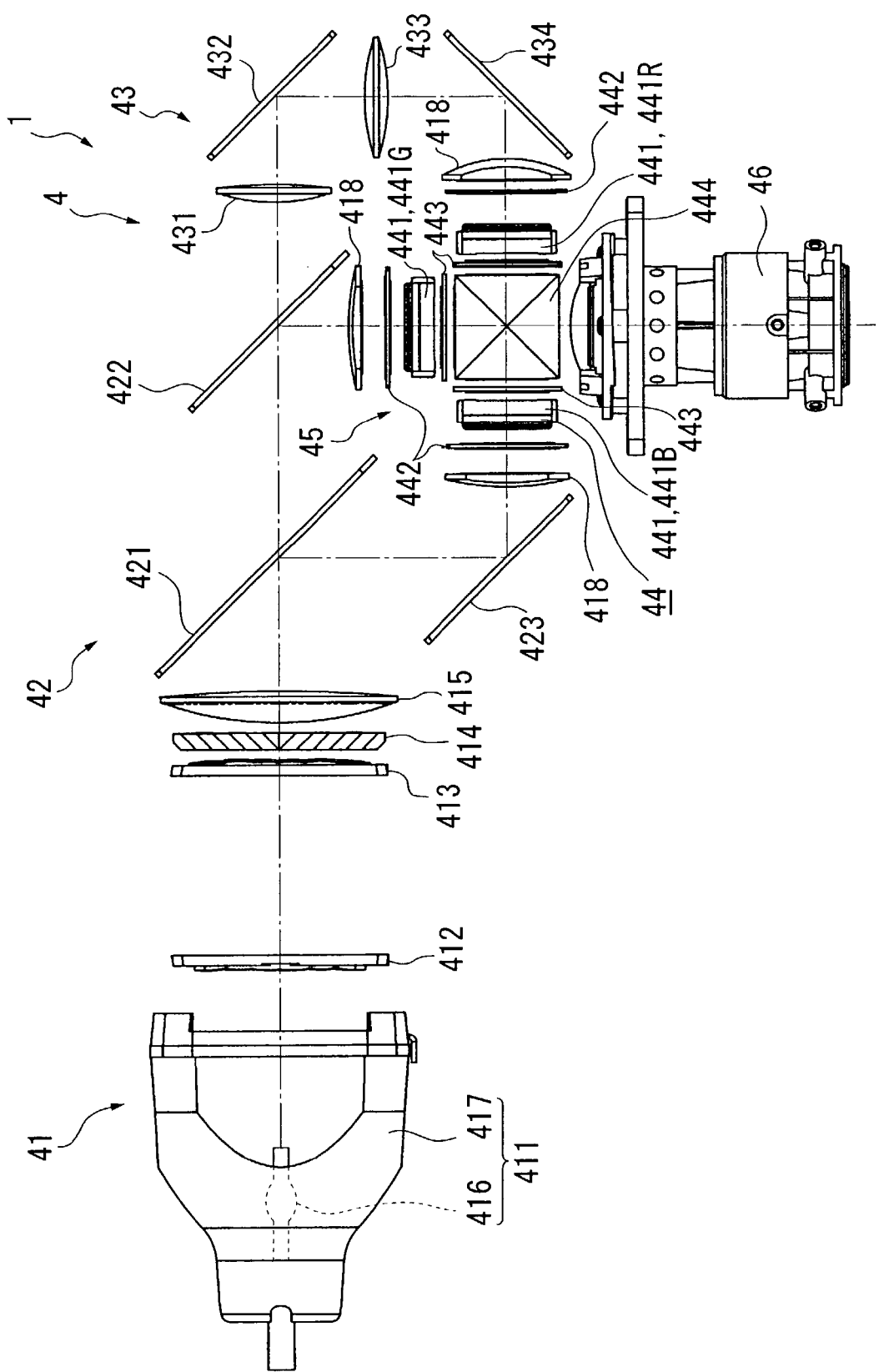
FIG. 6 is a schematic illustration showing a structure of the optical system of the aforesaid embodiment.

FIG. 5 is an exploded perspective view showing the optical unit 4. FIG. 6 is a schematic illustration of the optical unit 4.

As shown in FIG. 6, the optical unit 4 is a unit for optically process the light beam irradiated by a light source lamp 416 of a light source 411 to form an optical image corresponding to the image information and project the optical image in an enlarged manner, which includes an integrator illuminating optical system 41, a color separating optical system 42, a relay optical system 43, an optical device 44, the projection lens 46 as a projection optical system, and a light guide 47 made of synthetic resin for accommodating the optical components 41 to 44 and 46 (FIG. 5).

The integrator illuminating optical system 41 is a system for substantially uniformly illuminating the image formation area of the three liquid crystal panels 441 constituting the optical device 44 (respectively referred to as liquid crystal panel 441R, 441G and 441B for every color lights of red, green and blue), which includes the light source 411, a first lens array 412, a second lens array 413, a polarization converter 414 and a superposing lens 415.

The light source 411 has the light source lamp 416 as a radiation light source and a reflector 417, which changes the radial light beam irradiated by the light source lamp 416 into a parallel light beam by the reflector 417 to emit the parallel light beam toward the outside. A high-pressure mercury lamp is used as the light source lamp 416. Incidentally, metal halide lamp and a halogen lamp etc. may be used instead of the high-pressure mercury lamp. A parabolic mirror is used as the reflector 417. Incidentally, a combination of parallelizing concave lens and ellipsoidal mirror may be used instead of the parabolic mirror.

The first lens array 412 is a plurality of small lenses arranged in matrix, the lenses having substantially rectangular profile viewed from optical axis direction. The respective lenses split the beam emitted from the light source lamp 416 into a plurality of sub-beams. The profile of the respective lenses is approximately similar to the configuration of the image formation area of the liquid crystal panel 441. For instance, when the aspect ratio (ratio of horizontal and vertical dimensions) of the liquid crystal panels 441 is 4:3, the aspect ratio of the respective lenses is also set as 4:3.

The second lens array 413 has approximately the same arrangement as the first lens array 412, where the small lenses are disposed in matrix. The second lens array 413 as well as the superposing lens 415 focuses the image from the respective small lenses of the first lens array 412 onto the liquid crystal panel 441.

The polarization converter 414 is disposed between the second lens array 413 and the superposing lens 415. The polarization converter 414 converts the light from the second lens array 413 into a single polarized light in order to enhance light utilization efficiency in the optical device 44.

Specifically, the respective sub-beams converted into single polarized light by the polarization converter 414 are substantially superposed on the liquid crystal panel 441 of the optical device 44 by superposing lens 415. Since the projector 1 using the liquid crystal panel 441 for modulating polarized light can use only single polarized light, approximately half of the light from the light source lamp 416 emitting other random polarized light cannot be used. Accordingly, by using the polarization converter 414, all of the light emitted from the light source lamp 416 is converted into single polarized light to enhance light utilization efficiency in the optical device 44. Incidentally, such polarization converter 414 is disclosed in, for instance, Japanese Patent Laid-Open Publication No. Hei 8-304739.

The color separating optical system has two dichroic mirrors 421 and 422 and a reflection mirror 423, the dichroic mirrors 421 and 422 separating the plurality of sub-beams irradiated by the integrator illuminating optical system 41 into three color lights of red (R), green (G) and blue (B).

The relay optical system 43 has incident-side lens 431, a relay lens 43 and reflection mirrors 432 and 434, and introduces the red color light separated by the color separating optical system 42 onto the liquid crystal panel 441R.

At this time, the red light component and the green light component of the light beam irradiated from the illuminating optical integrator system 41 are transmitted through the dichroic mirror 421 of the color separating optical system 42 and the blue light component is reflected by the dichroic mirror 421. The blue light reflected by the dichroic mirror 421 is reflected by the reflection mirror 423, which reaches to the liquid crystal panel 441B for blue-color through a field lens 418. The field lens 418 converts the respective sub-beams emitted from the second lens array 413 into a light beam parallel to central axis (main beam) thereof. The field lenses 418 provided in front of the other liquid crystal panels 441G and 441R function in the same manner.

In the red light and the green light transmitted through the dichroic mirror 421, the green light is reflected by the dichroic mirror 422 to reach the liquid crystal panel 441G for green color through the field lens 418. On the other hand, the red color transmits through the dichroic mirror 422 to pass the relay optical system 43 and reach the liquid crystal panel 441R for red color through the field lens 418.

Incidentally, the relay optical system 43 is used for the red color light in order to prevent decrease in utilization efficiency of light on account of light diffusion caused by longer length of the optical path of the red light than the length of the optical path of the other color lights, in other words, in order to directly transmit the sub-beam incident on the incident-side lens 431 to the field lens 418. Incidentally, though the red light passes through the relay optical system 43, blue light may pass through the relay optical system 43 instead of red light.

The optical device 44 is for modulating the incident light beam in accordance with image information to form a color image, which has three incident-side polarization plates 442, the liquid crystal panels 441R, 441G and 441B disposed on the after-stage of the respective incident-side polarization plates 442 as optical modulators, an irradiation-side polarization plate 443 disposed on the after-stage of the respective incident-side polarization plates 442, and a cross dichroic prism 444 as a color combining optical system.

The liquid crystal panels 441R, 441G and 441B use, for instance, a poly-crystalline silicon TFT as a switching element.

In the optical device 44, the color lights separated by the color-separating optical system 42 are modulated by the three crystal panels 441R, 441G and 441B, the incident-side polarization plate 442 and the irradiation-side polarization plate 443 in accordance with image information to form an optical image.

The incident-side polarization plate 442 transmits only a polarized light of a predetermined direction among the respective color lights separated by the color separating optical system and absorbs the other light beam, which is constructed by forming a polarization film on a substrate of sapphire glass etc. Incidentally, polarization film may be formed on the field lens 418 without employing the substrate.

The irradiation-side polarization plate 443 is constructed in an approximately the same manner as the incident-side polarization plate 442, which transmits only a polarized light of a predetermined direction among the light beam irradiated by the liquid crystal panels 441 (441R, 441G and 441B) and absorbs the other light beam. Incidentally, polarization film may be formed on the cross dichroic prism 444 without employing substrate.

The polarization axes of the incident-side polarization plate 442 and the irradiation-side polarization plate 443 are set orthogonal with each other.

The cross dichroic prism 444 combines the optical image irradiated by the irradiation-side polarization plate 443 and modulated for respective color lights to form a color image. A dielectric multi-layer film for reflecting red color light and a dielectric multi-layer film for reflecting blue color light are formed along boundary of four right-angled prisms of the cross dichroic prism 444, the dielectric multi-layer films combining three color lights.

Figure 7:
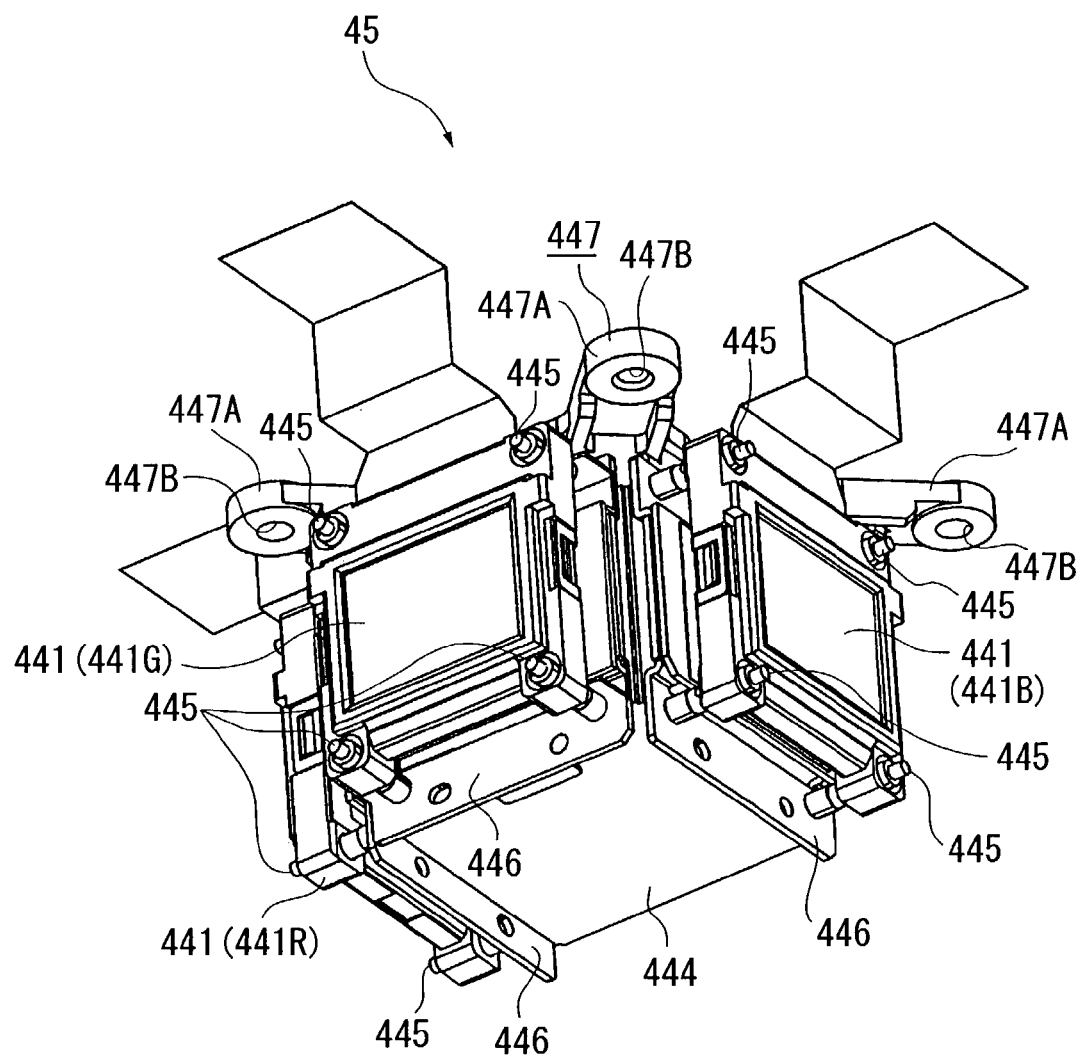
FIG. 7 is a perspective view showing an optical device provided with an electric optical device of the aforesaid embodiment.

The above-described liquid crystal panels 441, the irradiation-side polarization plate 443 and the cross dichroic prism 444 are constructed as an integrated unit of optical device body 45. FIG. 7 is a perspective view showing the optical device body 45.

As shown in FIG. 7, the optical device body 45 has the cross dichroic prism 444, a fixing plate 447 made of synthetic resin and fixed on the upper side of the cross dichroic prism 444, a metal holding plate 446 attached to the light-incident side of the cross dichroic prism 444 for holding the irradiation-side polarization plate 443, and the liquid crystal panels 441 (441R, 441G and 441G) held by four pins 445 made of transparent resin attached to the light-incident side of the holding plate 446.

A predetermined gap is secured between the holding plate 446 and the liquid crystal panel 441, so that the cooling air can flow through the gap.

The optical device body 45 is screwed to the lower light guide 471 through a circular hole 447B of four arms 447A formed on the fixing plate 447.

The projection lens 46 enlarges and projects the color image combined by the cross dichroic prism 444 of the optical device 44.

As shown in FIG. 5, the light guide 47 has the lower light guide 471 having a groove on which the optical components 412 to 415, 418, 421 to 423, 431 to 434 and 442 are slidably fitted from the above, and a lid-shaped upper light guide 472 for closing the upper opening of the lower light guide 471.

As shown in FIG. 5, the light source 411 is accommodated on a side of the lower light guide 471 of approximately planarly-viewed L-shape. The projection lens 46 is screwed to the other end of the lower light guide 471 through a head component formed on the lower light guide 471.

As shown in FIG. 5, the optical device body 45 accommodated in the lower light guide 471 is screwed to the lower light guide 471 with two springs 50 being sandwiched. The two springs 50 bias the field lens 418 and the incident-side polarization plate 442 toward lower side to fix the position thereof.

(3) Detailed Construction of Control Board

The control boar 5 controls drive of the liquid crystal panels 441R, 441G and 441B of the above-described optical unit 4 as an image generator, which includes a terminal switching selector 501, a LUT switching selector 502, an A/D converter 503, a color-mode setting changer 504, a driver IC 505, an operation signal receiver 506, a body-side selector 507, a signal receiver 508, a display switching determining portion 509, a connection switching controller 510 and a color-mode switching controller 511.

The color mode setting changer 504, the operation signal receiver 506, the display switching determining portion 509, the connection switching controller 510 and the color-mode switching controller 511 are constructed as programs operated on an MPU installed on the control board 5, which are usually stored in a memory such as ROM and are fetched to the MPU as required.

The terminal switching selector 501 switches the inputted image signal, which switches RGB signal input terminals PC1 and PC2, a separate signal input terminal S-Video and a composite signal input terminal Video provided on the main board 51 or the interface board 52 in the present embodiment.

The LUT switching selector 502 switches the LUT (LookUp Table) storing a predetermined color-mode setting information. In the present embodiment, sRGB mode is set on LUT1, normal mode is set on LUT 2, meeting mode is set on LUT 3, presentation mode is set on LUT 4, theater mode is set on LUT 5 and game mode is set on LUT 6.

The respective LUT 1 to 6 are stored in six EEPROM installed on the control board 5. The LUT switching selector 502 switches the connection between the MPU and the six EEPROM.

The A/D converter 503 converts an analog signal into a digital signal, which converts an analog image signal inputted from a composite signal input terminal Video or a separate signal input terminal S-Video into a digital signal to output to the MPU.

The color-mode setting changer 504 changes the color-mode setting in accordance with an operation on a color-mode setting switch provided on the body-side selector 507 or the remote controller 512.

In the present embodiment, the color-mode is set by initially selecting sharpness for changing profile of an image, selecting setting of three-dimensional LUT of table polarization method of image-processing, and finally selecting one-dimensional LUT storing setting such as environmental correction, contrast/color temperature, dynamic γ characteristics.

The switching operation of LUT1 to LUT6 means the selection of the three-dimensional LUT, the three-dimensional LUT being selected to set the color-mode in accordance with usage thereof.

Figure 8:
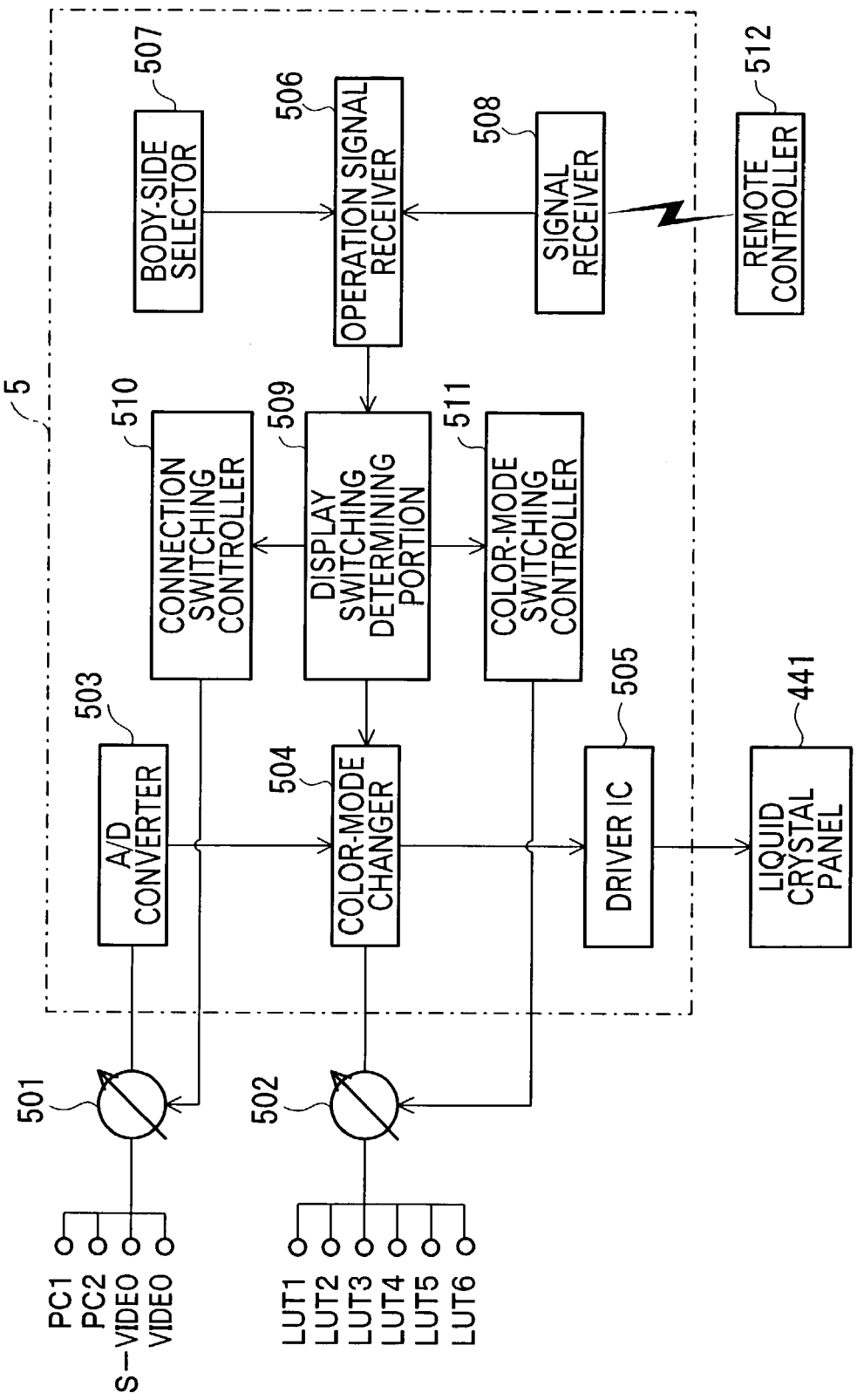
FIG. 8 is a block diagram showing a structure of a controller of the aforesaid embodiment.

The drive IC 505 is a circuit for driving the liquid crystal panel 441, which is composed of a data-driver circuit and a gate-driver circuit. Incidentally, though not shown in FIG. 8, the driver IC 505 is provided in plural on the control board in accordance with the respective liquid crystal panels 441R, 441G and 441B.

The operation signal receiver 506 receives the operation signal detected by the body-side selector 507 and the signal receiver 508. The MPU on the control board 5 conducts various setting of the projector 1 based on the operation signal received by the operation signal receiver 506. Incidentally, the operation signal receiver 506 does not receive the operation signal from the body-side selector 507 or the remote controller 512 while switching the setting by the connection switching controller 510 or the color-mode switching controller 511 as in the conventional arrangement for securely switching the setting without error.

The body-side selector 507 has a plurality of switches provided on the operation panel 23 of the projector 1 for operating various function setting of the projector 1, which specifically includes a volume switch, image adjusting switch for adjusting tracking, synchronization etc., a connection selector and a color-mode setting switch.

The signal receiver 508 receives infrared light signal transmitted from the remote controller 512, which is exposed on the front side 220 of the projector 1 (not shown in FIG. 1).

The remote controller 512 has various switches similar to the body-side selector 507, which includes a confirmation switch as well as a volume switch, image adjusting switch, a menu selector, a connection selector and a color-mode setting switch.

When one of the switches is operated by an operator, infrared light signal is transmitted from the remote controller 512, which is received by the signal receiver 508 to be outputted to the operation signal receiver 506.

The display switching determining portion 509 monitors the operation signal received by the operation signal receiver 506 to judge what kind of setting of the projector 1 is desired by an operator.

Though described below in detail, when the connection selector on the body-side selector 507 or the remote controller 512 is pressed, the display switching determining portion 509 displays a screen of a list of input terminals to which the connection can be switched on the liquid crystal panel 441 and urges the operator to select which image of the input terminal should be displayed.

Further, the display switching determining portion 509 displays a list of color modes stored in the above-described LUT1 to LUT6 for respective purposes on the screen when the operator selects the color-mode setting switch to urge the operator to select which color-mode to be set.

When no operation signal is received from the body-side selector 507 and the remote controller 512 for a predetermined period after displaying the above screen, the display switching determining portion 509 determines that the option on which a cursor is focused on the displayed list is finally selected. Then, the display switching determining portion 509 outputs the information on the determined-to-be-selected setting to the connection switching controller 510 or the color-mode switching controller 511.

The display switching determining portion 509 also determines that the option on which a cursor is focused is finally selected when the operator presses the confirmation switch (enter key) provided on the remote controller 512 etc. to output an operation signal indicating the confirmation. The information relating to the confirmed setting is outputted to the connection switching controller 510 or the color-mode switching controller 511 as in the above.

The connection switching controller 510 generates a control signal based on the connection setting finally determined by the display switching determining portion 509 to output to the terminal switching selector 501, thereby controlling the terminal switching selector 501 to switch the connection setting.

Figure 9:
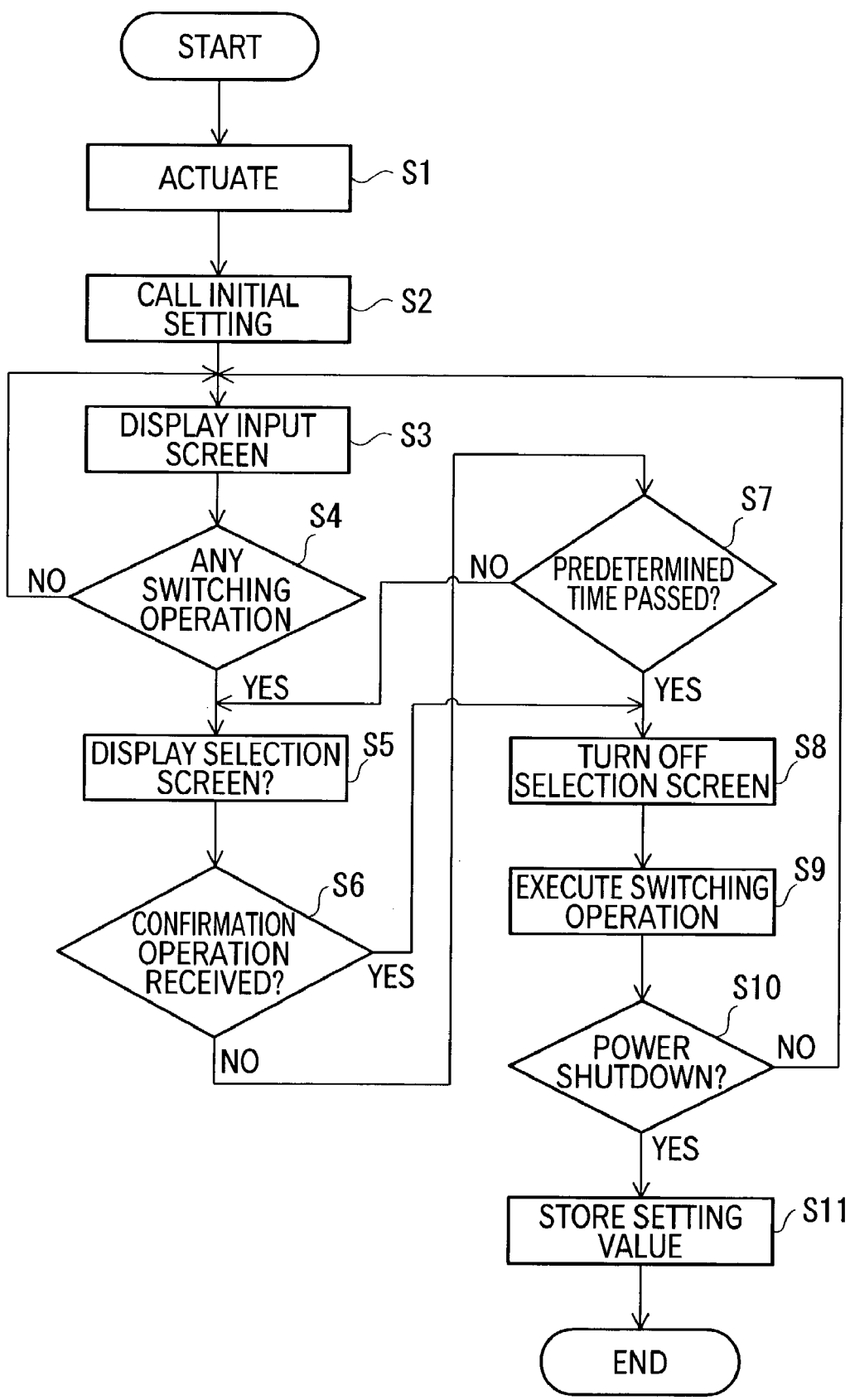
FIG. 9 is a flowchart showing a controlling step of the aforesaid embodiment.

The color-mode switching controller 511 generates a control signal based on the color-mode setting finally determined by the display switching determining portion 509 to output to the LUT switching selector 502, thereby controlling the LUT switching selector 502 to switch the color-mode setting (4) Step for Switching Connection Setting and Color-Mode Setting Next, the steps for switching the connection setting and the color-mode setting will be described below with reference to the flowchart shown in FIG. 9.

(4-1) When the projector 1 is actuated (step S1), the MPU installed on the control board 5 reads the initial setting value stored in the EEPROM (step S2) to start image projection of the projector 1 (step S3). Incidentally, the initial setting value called by the MPU is set based on the connection setting and the color-mode setting when the projector 1 is used last time.

(4-2) While projecting the image, the display switching determining portion 509 monitors the operation signal from the body-side selector 507 and the remote controller 512 inputted to the operation signal receiver 506 (step S4). When no operation signal relating to switching operation is inputted, the image is continuously displayed according to the current setting.

Figure 10:
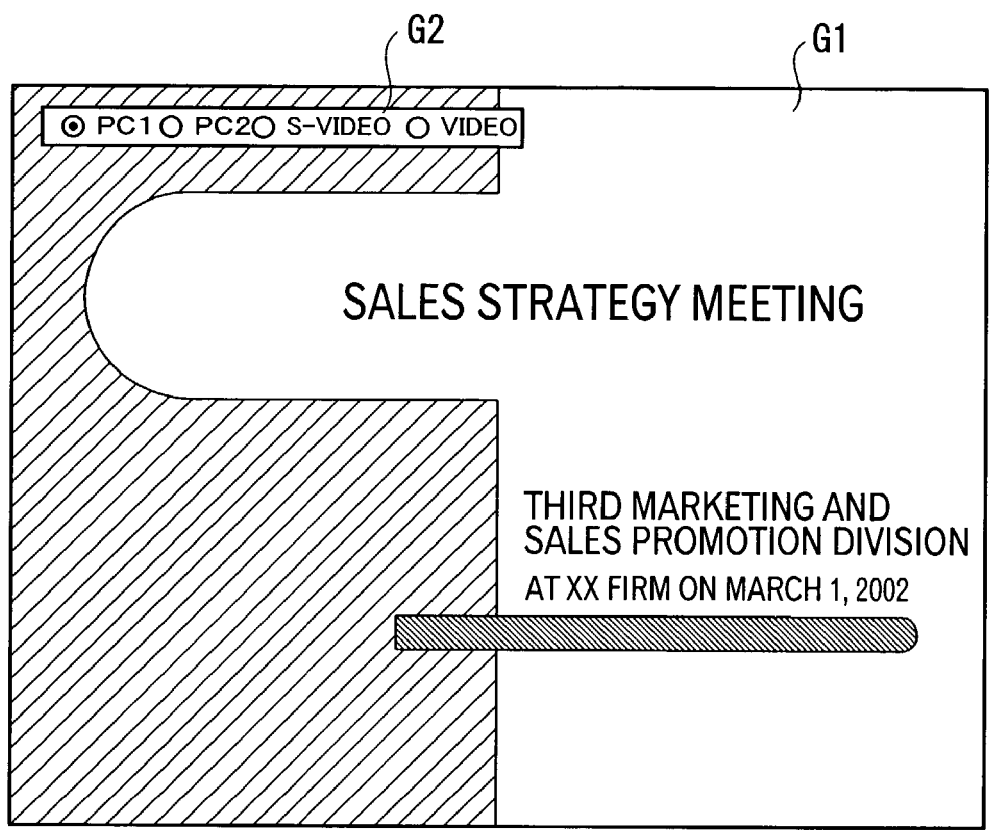
FIG. 10 is an example of a screen on which a selection screen is displayed.
Figure 11:
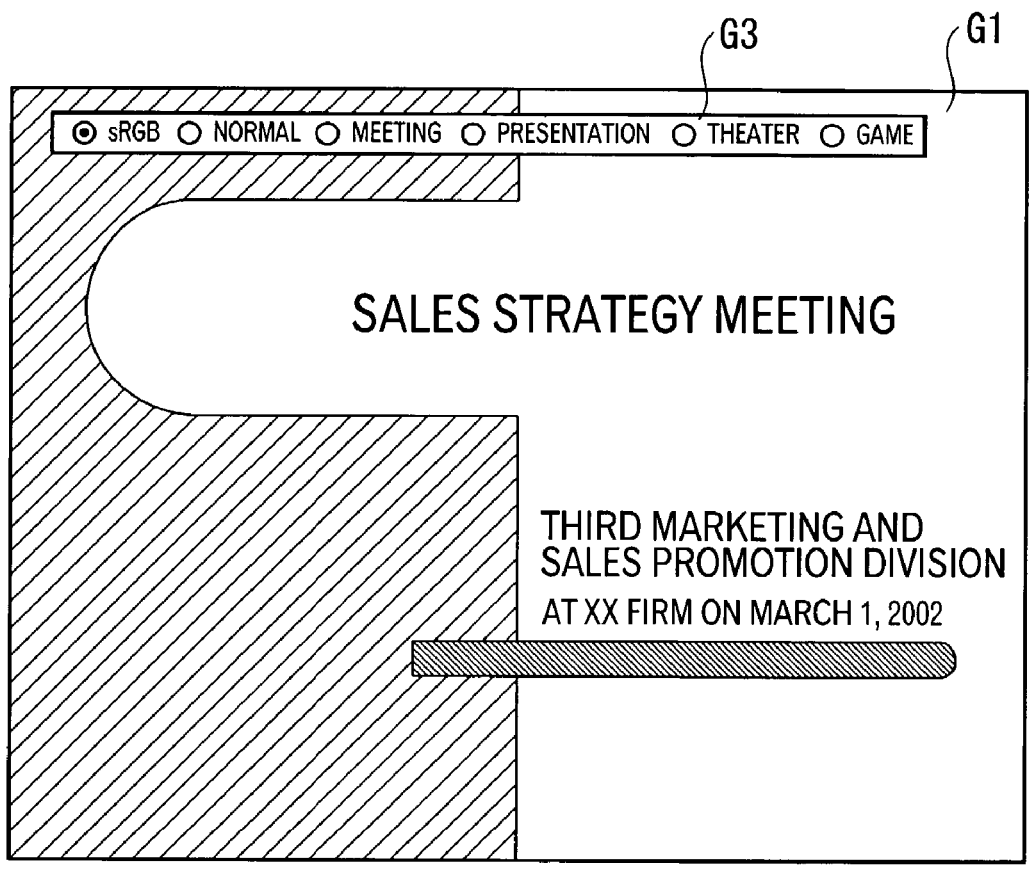
FIG. 11 is an example of a screen on which another selection screen is displayed.

(4-3) When the operator operates the connection switching switch or the color-mode setting switch of the remote controller 512 etc. and the operation signal is received by the operation signal receiver 506, the display switching determining portion 509 displays a selection screen having a list of connection setting of the color-mode setting on the liquid crystal panel 441 (step S5). In the present embodiment, as shown in FIG. 10, in selecting the connection setting, a selection screen G2 is displayed on a default screen G1 according to the current connection setting. In selecting the color-mode setting, selection screen G3 is displayed as shown in FIG. 11. In FIG. 10, in order to change true/false of the button on which the cursor is stopped, a connection setting switch of the remote controller 512 etc. is pressed to change the true value of PC1 to true value of PC2 to select PC2. When the connection setting switch is further pressed, the true value moves from S-Video, Video and again to PC1 in a cyclic manner, where the button bearing the true value represents the selected connection setting. The selection is conducted in the same manner on the color-mode selection screen G3 shown in FIG. 11.

(4-4) While displaying the selection screens G2 and G3, the display switching determining portion 509 monitors the operation signal receiver 506 to determine whether the confirmation operation signal is inputted from the remote controller 512 etc. or not (step S6). Further, while displaying the selection screens, the display switching determining portion 509 determines how long the operation signal is not inputted to the operation signal receiver 506 by a timer provided on the control board 5 (step S7).

(4-5) When it is judged that the current setting is selected when the operator operates the confirmation key to explicitly select the connection setting or the color-mode setting or when the operation signal is not inputted for a predetermined time, the display switching determining portion 509 obtains the connection setting of the color-mode setting according to the button having true value on the selection screen G2 or G3 and turns off the selection screen (stepS8), and outputs the obtained setting information to the connection switching controller 510 or the color-mode setting controller 511.

(4-6) The connection switching controller 510 or the color-mode setting controller 511 generates a control signal based on the setting information from the display switching determining portion 509 to output a control signal to the selectors 501 and 502 to execute switching operation by the selectors 501 and 502 (step S9).

(4-7) After the switching operation is executed by the selectors 501 and 502, the inputted image is re-displayed in accordance with the new setting (step S3). On the other hand, when the power switch of the projector 1 is pressed and the power is shut down (step S10), the MPU stores the connection setting and the color-mode setting at the time (step S11) before terminating.

(5) Advantage of First Embodiment

According to the above-described first embodiment, following advantages can be obtained.

(5-1) Since the switching control is conducted by the connection switching controller 510 or the color-mode setting controller 511 after the judgment by the display switching determining portion 509, display condition is not switched each time the operation signal is received, so that the display condition can be switched after designating the final display condition on the selection screens G2 and G3, thereby conducting switching operation of the connection setting and the color-mode setting with high speed.

(5-2) Since the selection screen G2 or G3 is displayed by the display switching determining portion 509 in determining the connection setting or the color-mode setting, the operator can select the setting while viewing the list of the connection setting or the color-mode setting, so that the switching operation can be conducted in an easily-recognizable manner.

(5-3) Since the display switching determining portion 509 determines that the setting selected at the time when no operation signal is inputted for a predetermined time is the final setting, the operator can conduct the confirmation and switching operation only by selecting one of the options shown on the screen G2 or G3, thereby simplifying the switching operation.

(5-4) Since the display switching determining portion 509 determines that the setting selected at the time when the operation signal receiver 506 receives the operation signal of the confirmation switch on the remote controller 512 etc., the switching operation can be conducted only by explicitly pressing the confirmation switch, so that the setting can be securely switched to the setting desired by the operator.

[2. Second Embodiment]

Next, a second embodiment of the present invention will be described below. Incidentally the same reference numeral will be attached to the same structure or the parts as those described above to omit or simplify the description therefor.

In the above-described first embodiment, the display switching determining portion 509 displays the selection screens G2 and G3 showing list of setting on the currently displayed screen G1 to urge the selection of the operator.

Figure 12:
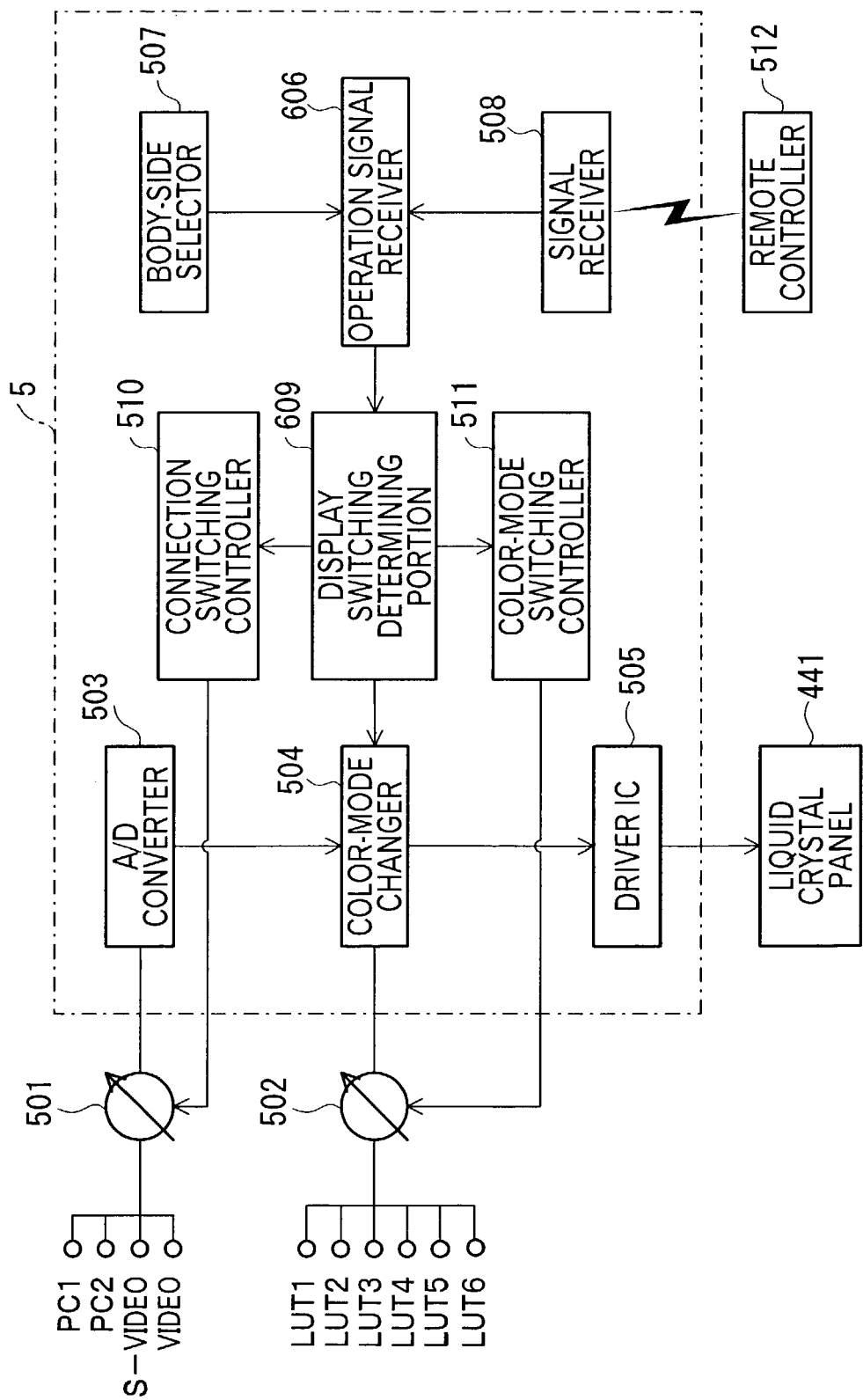
FIG. 12 is a block diagram showing a structure of a controller of a projector according a second embodiment of the present invention.

On the other hand, in the second embodiment, as shown in FIG. 12, though the basic structure of the control board 5 is the same as the first embodiment, an operation signal receiver 606 receives an operation signal irrespective of the switching control of the connection switching controller 510 or the color-mode switching controller 511.

Further, the display switching determining portion 609 does not immediately transmit the setting information to the connection switching controller 510 or the color-mode switching controller 511 even when the operation signal is received by the operation signal receiver 606 from the body-side selector 507 or the remote controller 512 and transmits the setting information at the time only after the operation signal is not inputted for a predetermined time.

The display switching determining portion 609 displays the connection setting information or the color-mode setting information in accordance with operation signal of the remote controller 512 on the screen.

Figure 13:
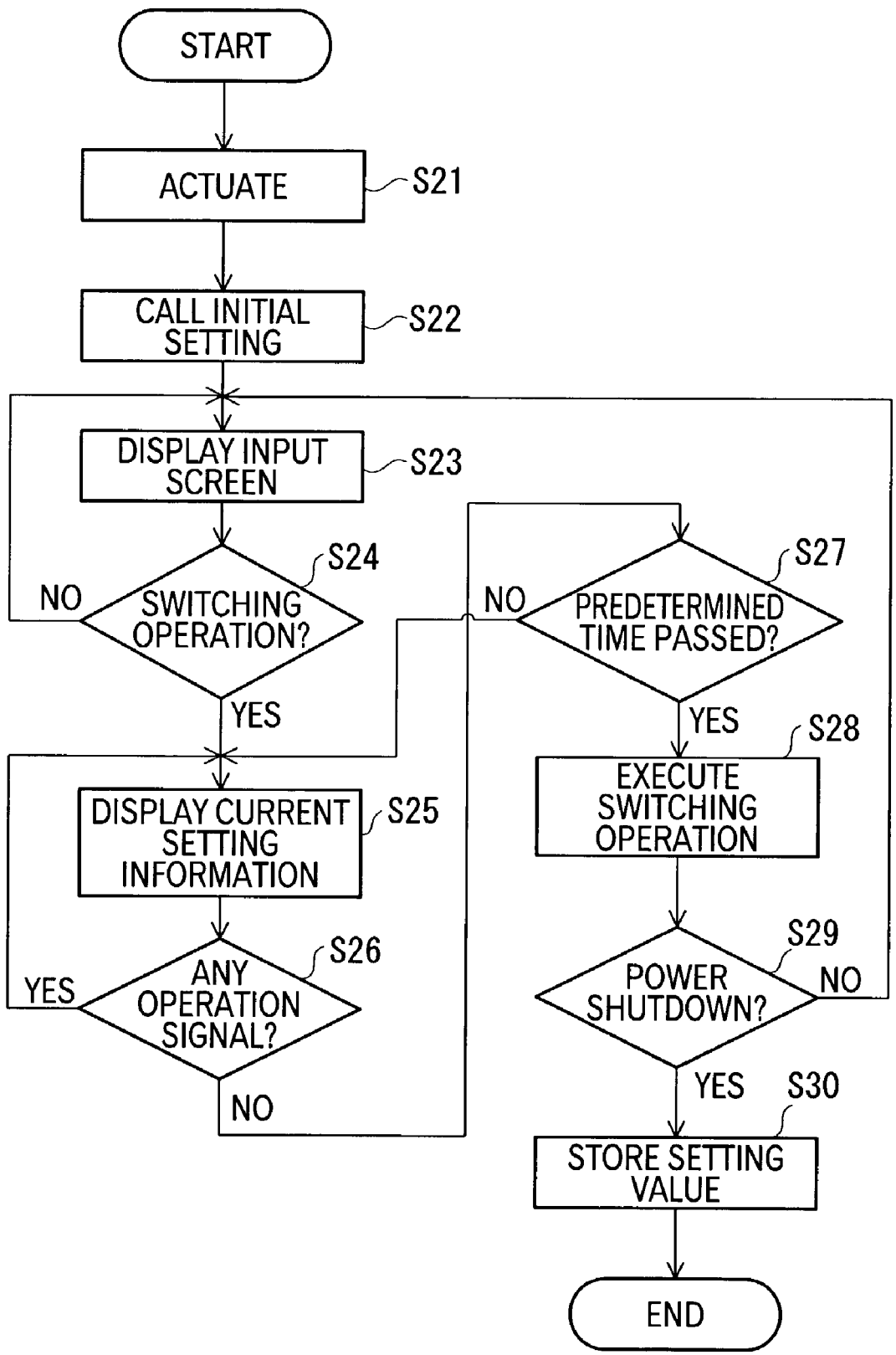
FIG. 13 is a flowchart showing a controlling process of the aforesaid embodiment.

Specific difference is represented as the steps for switching the setting, and the specific steps will be described below with reference to the flowchart shown in FIG. 13.

(1) When the projector is actuated (step S21), the initial setting value is read (step S22) to start image projection of the projector (step S23) as in the first embodiment.

(2) While projecting the image, the display switching determining portion 609 monitors the operation signal inputted to the operation signal receiver 606 (step S24).

Figure 14:
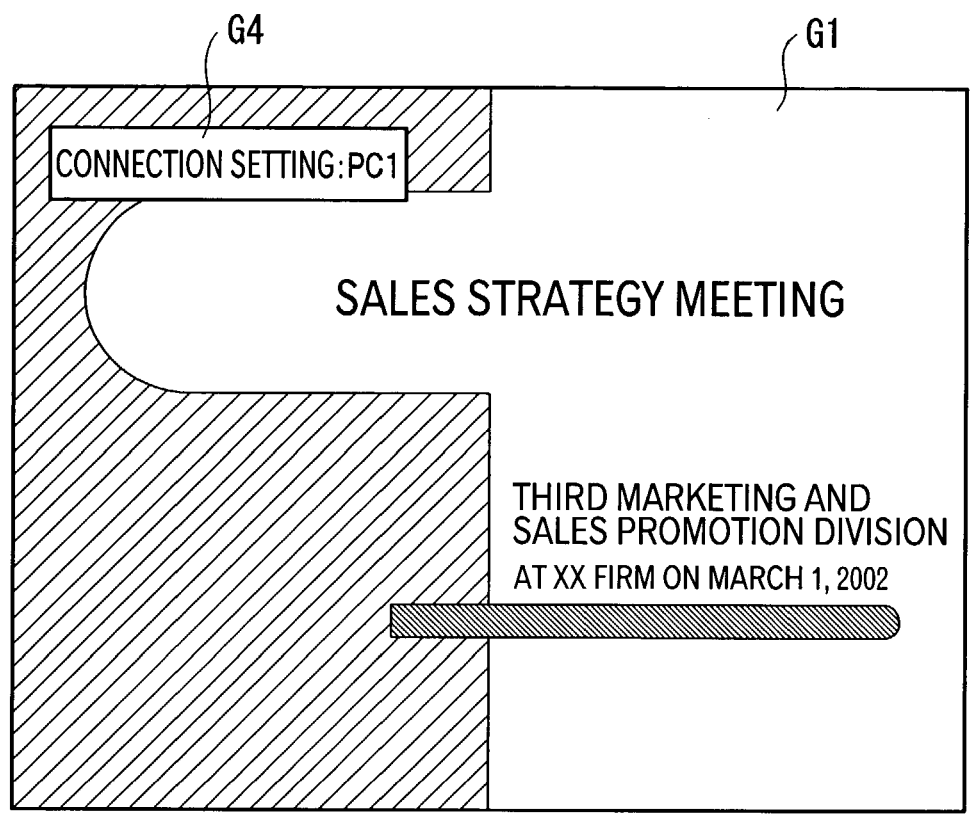
FIG. 14 is an example of a screen on which a current setting information screen is displayed.

(3) When the operator operates the connection setting switch on the remote controller 512 etc. and the operation signal is received by the operation signal receiver 606, the display switching determining portion 609 displays a current setting information screen G4 as shown in FIG. 14 on the currently-displayed screen G1 (step S25).

(4) When the operator further operates the connection setting switch while viewing the current setting information screen G4, the connection setting on the screen G4 changes from PC1 to PC2, S-Video and Video in a cyclic manner. The display switching determining portion 609 does not output the setting information to the connection switching controller 510 while the operation signal from the remote controller 512 is detected (step S26). Incidentally, the same arrangement applies to the color-mode setting.

(5) When the display switching determining portion 609 determines no operation signal for a predetermined time (step S27), the display switching determining portion 609 outputs the setting information displayed on the current setting information screen to the connection switching controller 510 or the color-mode switching controller 511 (step S28).

(6) The connection switching controller 510 or the color-mode switching controller 511 generates a control signal based on the setting information from the display switching determining portion 609 to execute switching operation by the selectors 501 and 502 (step S28).

(7) The image displaying step (step S29) and setting value storing step (step S30) after the setting is switched are the same as the first embodiment.

According to the above second embodiment, following advantage as well as the advantages of (5-1) and (5-2) of the first embodiment can be obtained.

Though the same switching method is used similar to the conventional setting switching process, the setting can be more speedily switched than the conventional arrangement. Specifically, when the connection setting switch is operated in a conventional connection switching, the display changes in the sequence of PC1, black screen for switching, PC2, black screen for switching, and S-Video, which took considerable time.

On the other hand, according to the above second embodiment, since the display changes in the sequence of PC1, PC2, S-Video and black screen for switching and switching process is conducted only once, so that the switching operation can be greatly accelerated.

Further, since the current setting information screen G4 indicating the current operating condition is displayed on the screen G1 while operating the connection setting switch or the color-mode setting switch, the switching operation can be conducted in an easily-recognizable manner for the operator.

Incidentally, the scope of the present invention is not restricted to the above-described embodiment, but includes following modifications.

Though the present invention is applied for switching the connection setting or the color-mode setting of the projector 1 in the first embodiment, the scope of the present invention is not restricted thereto. The present invention may be applied to a directly-viewing display. The electric optical device may not be a liquid crystal panel but may be a plasma device, organic EL device or a device using a micro-mirror.

Though the present invention is applied only for the connection setting or the color-mode setting in the first embodiment, the present invention may be applied in any setting operation where the desired setting is selected from various options and the switching operation takes time.

Though the display switching determining portion 609 does not start determining the setting before a predetermined time is elapsed in the second embodiment, the display switching determining portion 609 may start determining the setting when the confirmation switch is pressed by the operator as in the first embodiment.

The other specific structure and steps may be designed in any manner as long as an object of the present invention can be achieved.

What is claimed is:

1. An image display, comprising:
   an image generator that forms an optical image in accordance with an inputted image signal; and
   a controller that controls the image generator,
   the controller comprising: a display-condition switching controller that switches a display-condition of the optical image formed by the image generator;
   an operation signal receiver that receives an operation signal for switching the display-condition of the optical image; and a display switching determining portion that monitors the received operation signal to make a judgment on the display-condition to be switched, the display-condition switching controller switching the display-condition based on the judgment of the display switching determining portion, the operation signal receiver receiving the operation signal during the switching operation of the display-condition switching controller, and the display switching determining portion determining the display-condition to be switched on condition that the operation signal is not inputted for a predetermined time after showing the list of the display-condition, and the display switching determining portion showing an image representing a switching operation information received by the operation signal receiver.

2. The image display according to claim 1, wherein the display switching determining portion shows a screen indicating a list of the switchable display-conditions to urge selection of the display-condition to be switched.

3. The image display according to claim 2, wherein the display switching determining portion determines the display-condition to be switched on condition that the operation signal is not inputted for a predetermined time after showing the list of display-conditions.

4. The image display according to claim 1, wherein the display switching determining portion determines the display-condition to be switched on condition that a predetermined operation signal is received.

5. The image display according to claim 1, further comprising a plurality of input terminals for the image signal to be inputted from a plurality of image devices, wherein the display-condition is a connection setting of the plurality of input terminals.

6. The image display according to claim 1, wherein the display-condition is a color-mode setting including $\gamma$ correction and color compensation.

* * * * *